June 18, 1963 W. H. VAN DEBERG 3,093,970
SEQUENCE INTERRUPTING VALVE
Filed Aug. 23, 1960 4 Sheets-Sheet 1

INVENTOR.
WALTER H. VAN DEBERG
BY
Ralph L. Tweedale
ATTORNEY

June 18, 1963 W. H. VAN DEBERG 3,093,970
SEQUENCE INTERRUPTING VALVE
Filed Aug. 23, 1960 4 Sheets-Sheet 4

INVENTOR.
WALTER H. VAN DEBERG
BY
*Ralph L. Tweedale*
ATTORNEY

United States Patent Office 3,093,970
Patented June 18, 1963

3,093,970
SEQUENCE INTERRUPTING VALVE
Walter H. Van Deberg, Ferndale, Mich., assignor to The Thompson Company, Ferndale, Mich., a co-partnership
Filed Aug. 23, 1960, Ser. No. 51,331
4 Claims. (Cl. 60—54.5)

This invention relates to apparatus for interrupting a sequence of motion in a motion transfer system, and more particularly to a valve arrangement for varying the cyclical operation of a mechanico-hydraulic program motivator.

A mechanico-hydraulic motivator may be used to power and control machinery of any type which follows a repeated sequence of operations. The operating mechanisms on the machine may be moved by shiftable piston type hydraulic motors which are actuated in accordance with a program determined by the motivator. Such machinery is widely used for high volume mass production of similar workpieces.

One type of mechanico-hydraulic motivator which is readily adaptable to such machinery is the type deriving its basic motion from a single rotated camshaft. One or more rotary cams driven in unison by the shaft each actuates an expansible chamber type transmitter, such as a pulsator piston reciprocated in a fixed cylinder by a cam follower. An expansible chamber type receiver, such as a pulse responsive piston reciprocated in a cylinder, may be connected to a load device which is to be moved to and fro on the machine. A liquid column interconnecting the transmitter and the receiver to conduct motions therebetween may be confined in a flexible conduit to provide utmost adaptability for modern complex production machinery. A combined replenishing and relief valve arrangement may connect each liquid column with a liquid reservoir to balance the volume of liquid in each closed motion transfer section of the motivator.

One problem, however, in such mechanico-hydraulic motivator systems is the lack of freedom in varying the sequence of motions. The load devices will be moved in strict obedience to the contours of the rotary cams cycle after cycle. There are devices now available for effecting limited changes in the general sequence such as permanently advancing or retarding the timing of given sections of a multi-section motivator unit; however, mechanism heretofore available for limiting or omitting entirely a given section in response to some random variable factor usually requires the use of a human operator on a machine which would otherwise be automatic and need no tending.

Accordingly, it is an object of the present invention to provide sequence interrupting apparatus for a motion transfer system of the mechanico-hydraulic variety which is fully automatic and highly reliable in operation.

Another object of this invention is to provide sequence interrupting apparatus for a motion transfer system which may operate at infrequent intervals through a measuring device, such as a counter, so that the regular cam timed program of motions will be altered only at desired times in response to some random variable factor.

A further object of this invention is to provide sequence interrupting apparatus including a convertible valve of simple yet rugged construction which, by a simple rearrangement of parts, may be utilized in different manners with the apparatus to produce different effects of sequence interruption.

A further object is to provide a two position valve convertible to produce different reactions which is of such a design that it may readily be incorporated in the existing housings of known mechanico-hydraulic motion transfer units.

Further objects and advantages of the present invention will be apparent from the following detailed description, with reference to the accompanying drawings in which like reference characters refer to the same parts throughout the several views, and in which.

Figure 1:
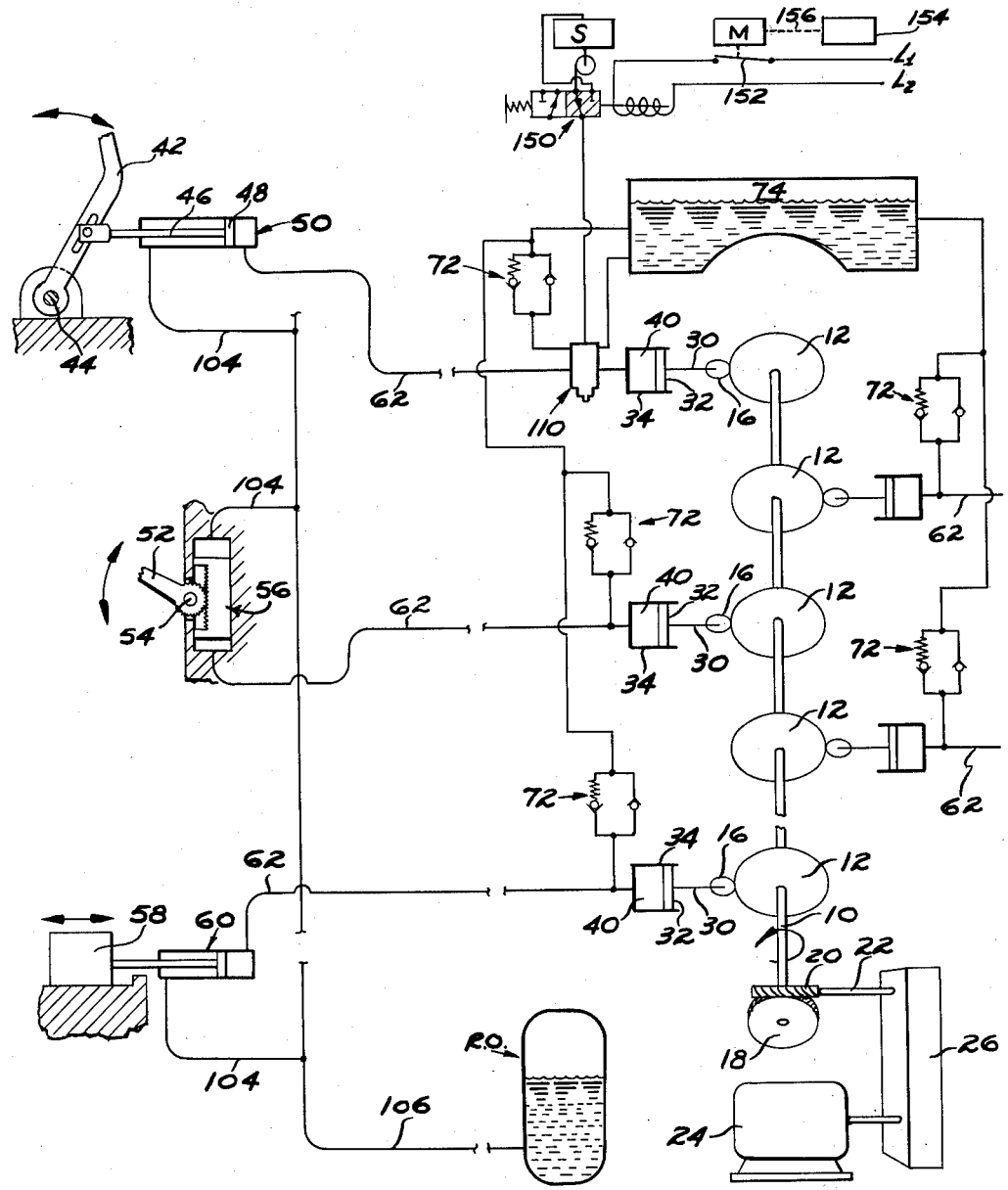
FIGURE 1 is a view in schematic fashion of a mechanico-hydraulic power and control unit including the sequence interrupting apparatus of this invention.
Figure 2:
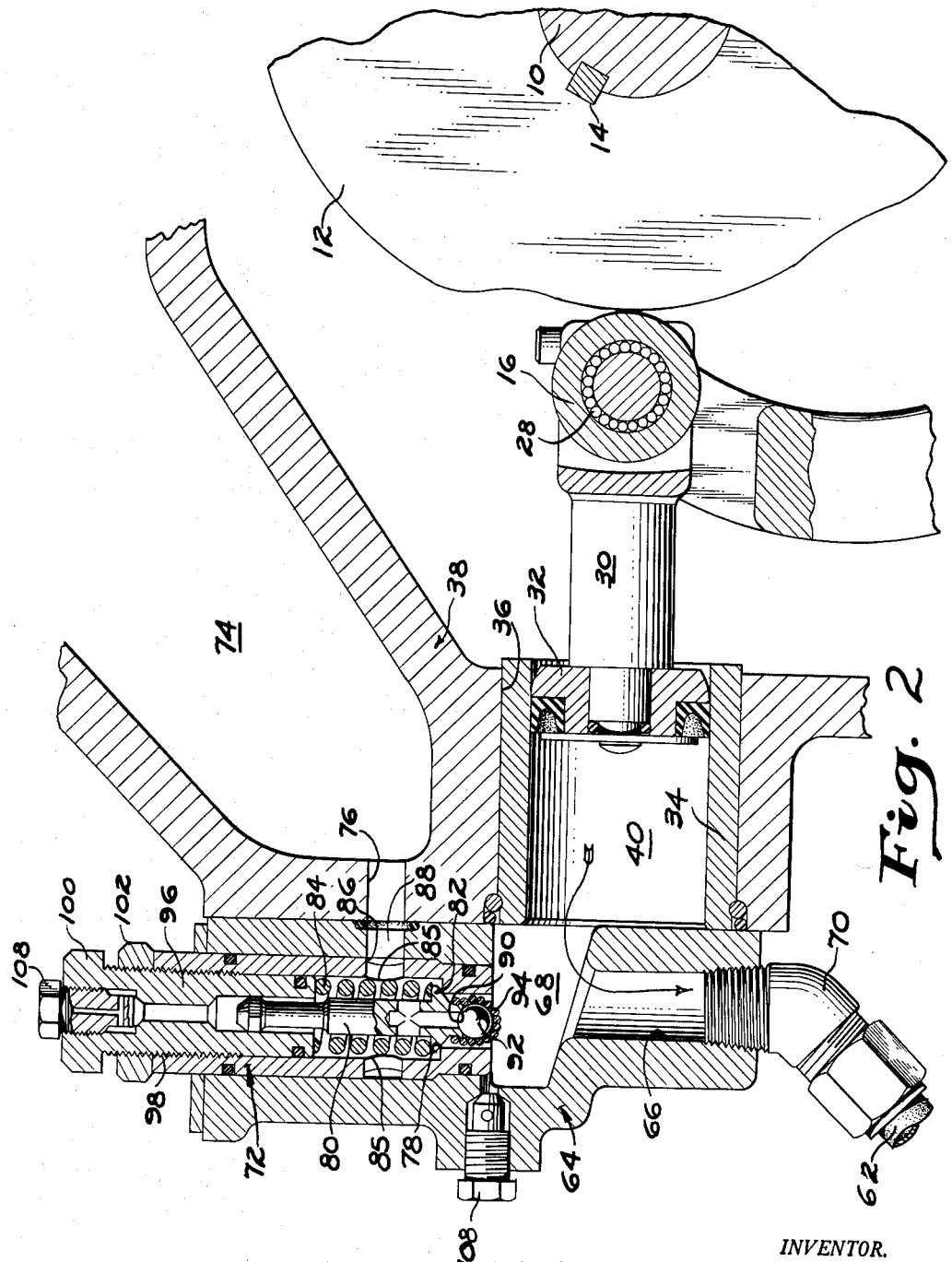
FIGURE 2 is a fragmentary sectional view showing an expansible chamber type transmitter, a portion of a liquid column, and a combined relief and replenishing valve interconnecting the liquid column and a liquid reservoir, all of a known variety.

In FIGURES 1 and 2, the basic elements of a rotary cam powered and controlled liquid column type motion transfer device are shown. Briefly, such a unit ordinarily comprises a main camshaft 10 having a plurality of rotary cams 12 keyed at 14 thereon, each cam having a contour (not specifically shown) composed of predetermined rise and fall ramps to produce a desired motion and impart it to a roller type cam follower 16 during each complete revolution or cycle of the cam. The camshaft 10 may derive its rotary motion from a worm wheel 18 secured thereon and driven by a worm gear 20 on a cross shaft 22. The shaft 22 may either be directly driven by a motor 24 or through a speed reducing transmission unit 26. The transmission may be of the plural speed variety to impart rapid rotary motion to the camshaft 10 during one portion of its revolution, and slower rotary motion through the remaining portion of its revolution, as desired; suitable means controlled by the camshaft 10 itself may be utilized to shift the transmission 26 from high to low speed, and vice versa.

Each cam follower 16 is journalled at 28 in the end of the rod 30 of a pulsator piston 32 reciprocable within replaceable sleeve type cylinders 34 received in suitable bores 36 of a cam housing 38. The main camshaft 10 may be journalled in the housing 38 so that motions imparted to the follower 16 by the cams 12 will move the piston 32 to and fro in the cylinders 34 to vary the size of the cylinder chamber 40. The cam, cam follower, piston linked to the cam follower, cylinder, and variable volume chamber comprise a pulse transmitter of the expansible chamber type.

At the left-hand portion of FIGURE 1 are several load devices to be moved which represent typical parts of a machine which are operated through a repeated sequence of motion. One such load device may comprise an arm 42 oscillatable about a pivot point 44 fixed on the machine by the piston rod 46 of the shiftable piston 48 of a fluid motor 50. Another load device may comprise a swinging arm 52 pivoted to the machine at 54 and reciprocated by a different type of shiftable rack piston fluid motor 56. Other familiar types of load devices represented by the block 58 may be moved to and fro on a guide way of the machine by means of the double acting hydraulic jack 60. All of the fluid motors 50, 56 and 60 with pulse responsive pistons represent expansible chamber type receivers.

Interconnecting the expansible chamber type receivers with the expansible chamber type transmitters, for the purpose of transferring motion from the cams to the load devices, are a plurality of liquid columns 62. The liquid columns may comprise any suitable hydraulic fluid confined by either rigid conduits or flexible piping to conduct a column or liquid link for to and fro motion between a transmitter and a receiver. The liquid column may be connected at one end to the receivers by suitable means, and at the other end to the transmitters by means of a cylinder head unit 64 secured to a flat face of the cam casing 38 and having a suitable port 66 extending outwardly from a chamber 68 which in turn communicates with the variable volume chamber 40. The liquid column 62 may communicate with the port 66 through a threaded connection 70.

Contained also in the cylinder head unit 64 is a balancing valve assembly 72 communicating between the liquid column (at the cavity 68) and a liquid reservoir 74 integral with the cam casing 38 by means of a port 76 in the casing.

The balancing valve assembly 72 may comprise a spring-loaded pressure relief valve and a check ball type replenishing valve. A circular valve seat 78 is normally closed by a conical end 82 of a plunger 80 loaded by a compression spring 84 against the seat 78. When the pressure in the liquid column exceeds the force of the spring 84, liquid will flow between the surfaces 78, 82 in the known manner and escape to the reservoir by means of radial ports 85 communicating with an exterior annular groove 86 in the valve unit 72, and a port 88 in the cylinder head unit 64 adjacent the port 76 to the reservoir 74. Fluid from the reservoir will, through the same channels, at all times find access to a central cavity drilled interiorly of the plunger 80 and closed by a retaining ball 92 urged to a position against circular seat 90 by a light retaining spring 94. When pressure in the liquid column falls below that of the liquid in the reservoir 74, which is maintained under a low, super-atmospheric pressure by a head of air in the conventional manner, the ball 92 will come away from its seat 90 enough to allow liquid to pass, whereby the pressure in the liquid column will never drop below that of the reservoir for more than an instant. An abutment member 96 threaded at 98 in the valve 72 serves to load the pressure relief spring 84 and may be adjusted by a suitable hex head 100, and secured in the adjusted position by a lock nut 102. Adjustment of the pressure load on the spring 84 determines at what pressure liquid will be diverted from the liquid column to the reservoir. Bleeder screws 108 located at high points in the system may be utilized to release trapped air. Thus the combined relief and replenishing valves connected between the reservoir and the liquid column serve to discharge and redeliver liquid from and to the column and thereby balance the volume of fluid in each of the sections of the mechanico-hydraulic motivator.

In order to insure proper synchronization of the driving and driven elements of each motion transfer section, it is desirable to provide slightly more liquid displacement in the driving or transmitting elements than is present in their respective fluid motors at the opposite end of the liquid column line. The stroke and consequently the displacement of the fluid motors may be limited by suitable limit stops built into the motors or associated with the load devices. Thus at the end of each advancing stroke of the transmitter piston 32, a small amount of liquid will be discharged into the reservoir 74 through the relief valve. This amount plus any amount lost by leakage will be replenished to the liquid column at the end of the return stroke by the operation of the replenishing valve 92.

In FIGURE 1 there are shown fluid lines 104 connected to the end of the expansible chamber type receiver motors opposite the liquid column connections. These lines communicate with a manifold line 106 containing fluid from a high pressure accumulator RO by means of which each of the individual motion transfer systems may be hydraulically biased to return the load devices to their rest positions and to maintain each follower 16 in close contact with its cam 12 as the falling portion of the cam contour recedes from the follower. The fluid in the accumulator RO may be pressurized by any known means that will provide a pressure adequate to return the load devices to their rest positions.

As the camshaft 10 of such known apparatus completes one revolution after another, so the load devices on the machine are moved through their desired sequence of operation in a repetitive, cyclical manner. However, on certain high volume mass production machinery, it may be desirable on occasion to alter the cycle through which the various load devices are moved in response to some factor variable remotely from the cams. For instance, in FIGURE 1, the swinging arm 42 may serve the purpose of feeding workpieces successively to a work position adjacent the wheel on an industrial grinding machine. The other load devices powered and controlled by the mechanico-hydraulic motivator would then be utilized for other operations on the grinding machine such as moving a workpiece in some manner while it is being ground, ejecting finished workpieces from the vicinity of the grinding wheel, operating gaging and sorting mechanism in conjunction with the grinding operation, and operating a retrueing tool to dress the wheel once on each cycle. On such a machine it may be desirable, for instance, to omit the function of the arm 42 after a new wheel has been installed on the machine, whereby the remaining load devices are moved through their normal cycle of action but no workpiece is fed to the wheel. This would allow the new and uneven wheel to be satisfactorily dressed through several cycles without feeding more workpieces which would be destroyed in such an operation.

Figure 3:
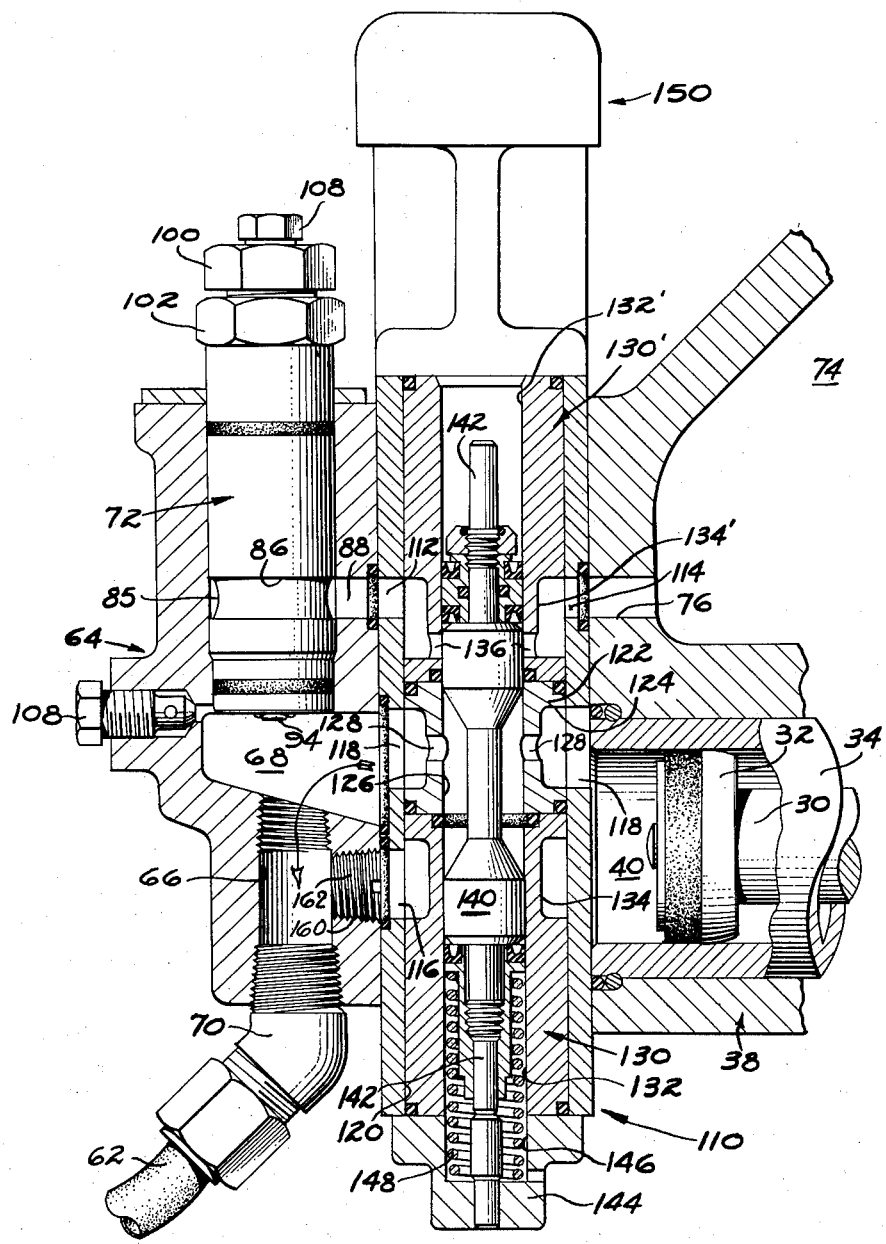
FIGURE 3 is a longitudinal sectional view of a sequence interrupting valve of this invention which may be utilized with such known mechanico-hydraulic program motivator equipment.
Figure 4:
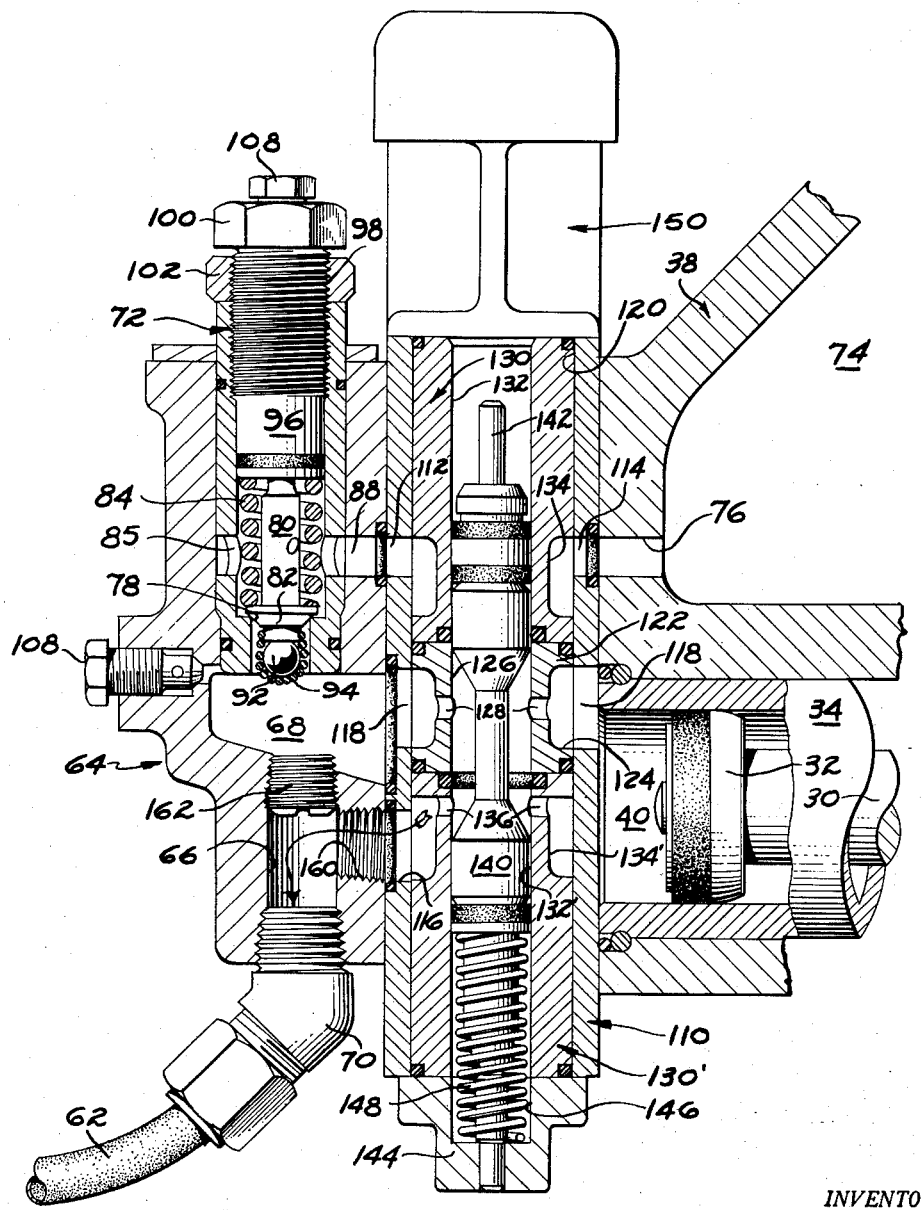
FIGURE 4 is a longitudinal sectional view of the valve shown in FIGURE 3 with parts interchanged to obtain a different type of sequence interruption.

Apparatus is provided by this invention for cancelling the motion of one of the load devices on a machine in response to a randomly varying factor. This apparatus takes the form of a convertible valve mechanism working in conjunction with suitable control apparatus which may include a pilot or operating valve. In FIGURES 3 and 4, the valve mechanism is shown as a unit contained within an outer casing 110 of rectangular cross section which may be secured to a known variety of cam case 38 at a location to close the outer end of the expansible chamber 40 in place of the cylinder head unit 64 which normally closes this chamber. As may be seen, the cylinder head unit 64 is then secured to the valve unit 110 in a manner which sandwiches the valve between the casing and the head unit.

Regarding FIGURE 3, outer casing 110 has several ports in its wall: port 112 communicates with the reservoir passage 88 in the cylinder head unit 64; port 114 communicates with the reservoir passage 76 in the cam casing 38; port 116 dead ends against a plug 162 which may be threaded in a tapped hole 160 in the lower portion of the cylinder head unit 64 in FIGURE 3, but is provided for a purpose later to be described; and, ports 118 located centrally on opposite sides of the casing 110 intercommunicate between the variable volume chamber 40 and the cavity 68 forming part of the liquid column. Valve body 110 also contains a central, longitudinal, unstepped cylindrical bore 120 with which the inner extremities of the various ports communicate, and which is designed to receive the working portions of the valve mechanism.

Located within the bore 120 intermediate the ends of the casing 110 is spacer member 122 having a deep annular groove 124 in communication with the valve body ports 118, and a central longitudinal bore 126 which communicates with the cannelure 124 by means of opposed radial ports 128. Spaced apart within the bore 120 of the main housing by the member 122 are a pair of sleeve-like inset members 130, 130'. Each insert fits cartridge-like within the bore 120, and each contains a central longitudinal bore 132, 132', co-dimensional and co-axial with the bore 126 of the spacer member 122. Each insert member has an annular exterior groove 134, 134' near its inner end adjacent the reservoir ports 112, 114 and the port 116 in the valve body.

The insert member 130' differs from the member 130 only by the addition of a pair of ports 136 allowing communication between the annular groove 134' and the central bore 132'. As will be seen, the two inserts may be assembled interchangeably to position the ported insert 130' either above or below the spacer member 122 to convert the valve mechanism into two different units for producing two entirely different results.

Shiftable to and fro within the bore extending through the members 130, 130' and 122 is a shiftable valve member taking the form of a shouldered spool 140 adapted to uncover ports in the cylindrical wall near the central reduced diameter portion of the spool, and to cover ports in the wall with the larger diameter portions at either end of the spool member. On either end of the spool member 140 are adjustably threaded appropriate limit stop members 142 designed to abut bore closure members to determine the stroke of the spool. Lower closure member 144 secured to the valve body 110 contains a recessed spring seat 146 in which a compression coil spring 148 is bottomed. The spring 148 maintains an upward bias on the spool member 140 urging the upper limit stop 142 against the upper end cap 150 of the valve body.

Upper end cap 150 may comprise a two position, three way fluid valve spring-urged to one position exhausting fluid from the central bore of the uppermost of the insert members to a source S of fluid, and solenoid-actuated to the other position wherein pressurized fluid from the supply S is admitted to the upper bore against the upper end of the spool member 140 to urge it downwardly compressing the spring 148.

The solenoid for the pilot valve 150 may obtain its current from electric supply lines L1 and L2, one of which may be interrupted by a make-or-break switch 152 operated by a measuring device M, which may be any suitable mechanism from a manually operated push button to a highly complicated commercial size-determining apparatus; a counter is disclosed by way of representative example. The counter may be controlled by any factor variable independently of the cyclically acting cams 12, such factor being diagrammatically represented by the rectangle 154 and having a relationship 156 with the measuring device M. When the measuring device M opens the switch contacts 152 in response to a factor 154 and allows the pilot valve 150 to exhaust fluid from the upper portion of the sequence interrupting valve 110, the spool mechanism 140 of the sequence interrupting valve will shift to the upward spring-urged position.

With the insert members 130, 130' inserted in the manner shown in FIGURE 3 with the ported member 130' in the upper position, the normal or pressure regulated position of the valve 110 will allow uninterrupted movement of the liquid column through the valve via ports 118, 128 for normal operation of the mechanico-hydraulic motion transfer system. In the spring-urged interrupting position, the spool 140 will shift upwardly uncovering ports 136 and allowing communication between them and the ports 128 via the central longitudinal bore. In the latter position the liquid column is in direct communication with the reservoir 74 and the piston of the expansible chamber receiver will be urged immediately to its rest position and held there by high pressure fluid from the source RO. Continued operation of the transmitter piston 32 will merely divert transmitted liquid through the ports 128 and 136 to and from the reservoir 74.

With the inserts 130, 130' arranged oppositely, as in FIGURE 4, and the cylinder head unit 64 altered by opening the port 160 communicating between the cavity 66 and the port 116 in the wall of the valve body by simply moving the plug 162 to prevent communication between the cavities 66 and 68, a different result will be obtained. In this arrangement, with the spool 140 in the lower fluid responsive position, the liquid column 62 will again extend in normal uninterrupted fashion to the pulsator piston 32 through the following channel: ports 66, 160, 116, 136, 128 and 118. When the spool member 140 is shifted to the upper spring-urged position, however, by interruption of pressure from supply S by the pilot valve 150, the liquid column will be blocked off at ports 136 by the enlarged diameter portion of the spool member 140. Liquid moved by pulsator piston 32 as it contracts the volume of the chamber 40 will escape to the reservoir through the pressure relief valve seat 78 of the balancing valve mechanism 72. Obviously, the liquid column 62 may be blocked off by the valve 110 when the receiver piston in the load moving fluid motor is at any desired position. The liquid column 62 will hold the receiver piston in this position in spite of the piston-returning pressure from the source RO, as will be understood, and in spite of the continued operation of the transmitter piston 32.

Thus the difference in result obtained by the two arrangements shown in FIGURES 3 and 4 is apparent. In both arrangements, one position of the valve 110 of the sequence interrupting apparatus allows free movement of the liquid column and ordinary operation of the balancing valve 72 in normal fashion to move the load device. In the FIGURE 3 arrangement, the other position of the valve 110 allows unobstructed flow between the liquid column and the liquid reservoir by-passing the relief and replenishing valve and maintaining the motor piston in its rest position. In the FIGURE 4 arrangement, the other position of the valve 110 prevents all movement of the liquid column in spite of the location of the receiver piston and diverts liquid from a contracting transmitter chamber through the relief valve to the liquid reservoir to hold the receiver piston in a desired position. In effect, the FIGURE 3 arrangement "dumps" the liquid column into the reservoir, and the FIGURE 4 arrangement "blocks" movement of the liquid column. Operation of either arrangement is still controlled by the same pilot valve 150 in response to the measuring device M which varies independently of the cams 12.

Thus a sequence interrupting apparatus including a two position valve is provided which alters the cam-controlled sequence of operation of a mechanico-hydraulic motion transfer system. In such a system which utilizes a plurality of motion transfer sections, such sequence interrrupting apparatus may be associated with one or more of the sections whereby only those sections may be interrupted while the other sections continue their normal, cyclical operation. Furthermore, the load moving fluid motor connected with the interruptable motion transfer section may be rendered inoperative in two different ways: the load device may be immediately moved to and held in its rest position upon operation of the sequence interrupting apparatus, or the load device may be held in the position in which it happens to be when the sequence interrupting apparatus is operated.

While the above described embodiment describes a preferred mode of carrying out this invention, many other forms might be adopted within the scope of the actual invention, which is variously claimed as:

1. In a motion transfer system the combination of an expansible chamber type transmitter, an expansible chamber type receiver, a liquid column connected between the transmitter and the receiver, a liquid reservoir, relief and replenishing valves connected between the reservoir and the liquid column to discharge and re-deliver liquid to the column, and a two position valve operatively connected in the system and convertible to be associated with the liquid column in either of two different ways, in both of which one valve position allows unobstructed movement of the liquid column and in one way of association the other valve position prevents all movement of the liquid column and diverts liquid from a contracting transmitter chamber through the relief valve to the liquid reservoir and in the other way of association the other valve position allows unobstructed flow between the liquid column and the liquid reservoir by-passing the relief and replenishing valves.

2. In a motion transfer system the combination of a power driven camshaft, a plurality of programming and driving cams in fixed relation on the camshaft, a housing forming an enclosure for the cams and having a plurality of cylinder bores formed therein, one cylinder bore in lateral alignment with each cam and each cylinder bore forming part of an individual liquid column motion transfer device, means in the upper part of the housing forming a separate liquid reservoir, a plurality of individually detachable cylinder heads secured to the housing to close the ends of the cylinder bores, a liquid volume balancing valve for the associated motion transfer device formed in each cylinder head, balancing valve passages formed partly in the housing and partly in each head interconnecting each balancing valve between its associated liquid column motion transfer device and the liquid reservoir, a program interrupting valve connected with one of the liquid column motion transfer devices including a casing detachably secured between the cam housing and one of the cylinder heads, passages in the casing interconnecting the balancing valve passages of the one cylinder head and the housing, and valve means in the casing shiftable to interrupt normal operation of the one liquid column motion transfer device while the programming and driving cams continue normal operation.

3. In a motion transfer system the combination of a plurality of single-acting expansible chamber type pulse transmitters and a plurality of rotary cam means driven in unison connected to actuate the transmitters through repeated cycles of coordinated motion, a plurality of double-acting expansible chamber type pulse receivers and a plurality of shiftable machine devices connected to be driven by the receivers through a repeated sequence of coordinated motion, stop means for limiting the displacement of each receiver to an amount smaller than the displacement of its associated transmitter, a plurality of liquid columns connected between the transmitters and the receivers to transfer motion therebetween, a source of pressurized fluid and means connecting the source with each receiver in opposition to the liquid column connection to bias the receivers counter to transmitted motions, a common liquid reservoir, overload relief and check refill valves interconnecting each liquid column and the reservoir to balance the volume of liquid in each column, and means for interrupting the sequence of motion of the shiftable machine devices while the cam means continues cyclically to actuate the transmitters including a factor which varies independently of the cycle, valve means connected with one of the liquid columns, the valve means being shiftable between two positions one of which allows uninterrupted operation of the liquid column and the other of which opens flow directly between the liquid column and the liquid reservoir by-passing the overload relief and check refill valves, control means connected to normally shift the valve means to the one position, and automatic means responsive to the independently variable factor connected to shift the valve means to the other position.

4. In a motion transfer system the combination of a plurality of single-acting expansible chamber type pulse transmitters and a plurality of rotary cam means driven in unison connected to actuate the transmitters through repeated cycles of coordinated motion, a plurality of double-acting expansible chamber type pulse receivers and a plurality of shiftable machine devices connected to be driven by the receivers through a repeated sequence of coordinated motion, stop means for limiting the displacement of each receiver to an amount smaller than the displacement of its associated transmitter, a plurality of liquid columns connected between the transmitters and the receivers to transfer motion therebetween, a source of pressurized fluid and means connecting the source with each receiver in opposition to the liquid column connection to bias the receivers counter to transmitted motions, a common liquid reservoir, overload relief and check refill valves interconnecting each liquid column and the reservoir to balance the volume of liquid in each column, and means for interrupting the sequence of motion of the shiftable machine devices while the cam means continues cyclically to actuate the transmitters including a factor which varies independently of the cycle, valve means connected with one of the liquid columns, the valve means being shiftable between two positions one of which allows uninterrupted operation of the liquid column and the other of which blocks movement of the liquid column and compels transfer of liquid between the transmitter and the liquid reservoir through the overload relief and check refill valves, control means connected to normally shift the valve means to the one position, and automatic means responsive to the independently variable factor connected to shift the valve means to the other position.

References Cited in the file of this patent

UNITED STATES PATENTS

| | | |
|---|---|---|
| 662,515 | Yale | Nov. 27, 1900 |
| 1,802,790 | Squires | Apr. 28, 1931 |
| 2,192,778 | Stacy | Mar. 5, 1940 |
| 2,429,390 | Case | Oct. 21, 1947 |
| 2,446,862 | Wilders et al. | Aug. 10, 1948 |
| 2,720,130 | Chang | Oct. 11, 1955 |
| 2,767,547 | Pegard | Oct. 23, 1956 |
| 2,915,016 | Weaver et al. | Dec. 1, 1959 |

FOREIGN PATENTS

| | | |
|---|---|---|
| 971,491 | Germany | Feb. 5, 1959 |